(12) United States Patent
Hartman et al.

(10) Patent No.: US 6,961,773 B2
(45) Date of Patent: Nov. 1, 2005

(54) SYSTEM AND METHOD FOR MANAGING APPLICATION SERVICE PROVIDERS

(75) Inventors: Robert Charles Hartman, Aurora, CO (US); John Elton Dietrich, II, Longmont, CO (US); Jeffrey James Finn, Englewood, CO (US); Rodney Dean Holm, Evergreen, CO (US)

(73) Assignee: eSoft, Inc., Broomfield, CO (US)

( * ) Notice: Subject to any disclaimer, the term of this patent is extended or adjusted under 35 U.S.C. 154(b) by 824 days.

(21) Appl. No.: 09/766,469

(22) Filed: Jan. 19, 2001

(65) Prior Publication Data

US 2002/0156876 A1 Oct. 24, 2002

(51) Int. Cl.[7] .......................... G06F 15/177; G06F 9/44
(52) U.S. Cl. ..................... 709/227; 717/168; 717/171
(58) Field of Search ............................... 709/220, 221, 709/227, 225, 226; 717/168, 171

(56) References Cited

U.S. PATENT DOCUMENTS

| 5,870,717 A | * | 2/1999 | Wiecha ........................ 705/26 |
| 5,923,885 A | | 7/1999 | Johnson et al. |
| 6,269,393 B1 | | 7/2001 | Yost et al. |
| 6,271,846 B1 | | 8/2001 | Martinez et al. |
| 6,314,167 B1 | | 11/2001 | Johnson |
| 6,347,336 B1 | | 2/2002 | Song et al. |
| 6,457,076 B1 | * | 9/2002 | Cheng et al. .................. 710/36 |
| 6,526,406 B1 | * | 2/2003 | Suzuki et al. .................. 707/10 |
| 6,532,488 B1 | * | 3/2003 | Ciarlante et al. ........... 709/205 |
| 6,606,603 B1 | * | 8/2003 | Joseph et al. .................. 705/26 |
| 6,654,779 B1 | * | 11/2003 | Tsuei ........................... 718/101 |
| 6,816,882 B1 | * | 11/2004 | Conner et al. .............. 709/203 |
| 2002/0026507 A1 | * | 2/2002 | Sears et al. ................... 709/224 |

OTHER PUBLICATIONS

PCT International Search Report.
PCT International Search Report, Apr. 1, 2002.

* cited by examiner

Primary Examiner—Larry D. Donaghue
(74) Attorney, Agent, or Firm—Cooley Godward LLP

(57) ABSTRACT

A managed services platform. An applications management server is provided for managing relationships with application service providers and others over a wide area network such as the Internet. The applications management server interfaces with a master database server and the servers of one or more application service providers, or other entities, to facilitate selection and deselection of applications, services, and capabilities that may be available for use by the information technology network of a company.

8 Claims, 7 Drawing Sheets

SoftPak Director 101

User License Level – This is the user license level your Instagate EX is currently licensed for. Any SoftPaks that do not have their own user license level will automatically be subscribed at this level. You may select a new user license level to upgrade/downgrade your system by selecting the new level from the pulldown menu and pressing the "Change" button. Any SoftPaks you are currently subscribed to will have their monthly fees adjusted accordingly.

25 Users 110

Change 112

---

Anti-Virus – Provides inspection of inbound and intra-office email attachments for known computer viruses.
Subscribe for only: 750.00/yr     Subscribe 106a

Firewall Policy Manager – Provides granular management of firewall policy and additional logging capabilities.
Subscribe for only: 115.00/yr     Subscribe 106a

Internet Server – Web, FTP, and Domain Name servers.
Subscribe for only: 115.00/yr     Subscribe 106a

Modem Communication – RAS and Failover support.
Subscribe for only: 175.00/yr     Subscribe 106a

SiteFilter – Provides URL web site filtering and blocking based on a dynamic URL database.
Subscribe for only: 540.00/yr     Subscribe 106a

SoftPak Director 

User License Level – This is the user license level your Instagate EX is currently licensed for. Any SoftPaks that do not have their own user license level will automatically be subscribed at this level. You may select a new user license level to upgrade/downgrade your system by selecting the new level from the pulldown menu and pressing the "Change" button. Any SoftPaks you are currently subscribed to will have their montly fees adjusted accordingly.

[25 Users ▢] 110

[Change] 112

Anti-Virus – Provides inspection of inbound and intra-office email attachments for known computer viruses.
This service has been selected but not yet downloaded

[Unsubscribe] 106b

Firewall Policy Manager – Provides granular management of firewall policy and additional logging capabilities.
Subscribe for only: *115.00/yr*

[Subscribe] 106a

Internet Server – Web, FTP, and Domain Name servers.
Subscribe for only: *115.00/yr*

[Subscribe] 106a

Modem Communication – RAS and Failover support.
Subscribe for only: *175.00/yr*

[Subscribe] 106a

SiteFilter – Provides URL web site filtering and blocking based on a dynamic URL database.
Subscribe for only: *540.00/yr*

[Subscribe] 106a

[Download Now] 114

FIG. 4B

SoftPak Director (?) — 105

User License Level – This is the user license level your Instagate EX is currently licensed for. Any SoftPaks that do not have their own user license level will automatically be subscribed at this level. You may select a new user license level to upgrade/downgrade your system by selecting the new level from the pulldown menu and pressing the "Change" button. Any SoftPaks you are currently subscribed to will have their montly fees adjusted accordingly.

25 Users ☐ — 110
Change — 112

Anti-Virus – Provides inspection of inbound and intra-office email attachments for known computer viruses.
This service has been selected but not yet downloaded Unsubscribe — 106b

Firewall Policy Manager – Provides granular management of firewall policy and additional logging capabilities.
Subscribe for only: 115.00/yr Subscribe — 106c

Internet Server – Web, FTP, and Domain Name servers.
Subscribe for only: 115.00/yr Subscribe — 106c

Modem Communication – RAS and Failover support.
Subscribe for only: 175.00/yr Subscribe — 106c

SiteFilter – Provides URL web site filtering and blocking based on a dynamic URL database.
Subscribe for only: 540.00/yr Subscribe — 106c

111

107

Install Now — 116

Install new/updated software. The machine will reboot itself during this process. You need to restart your browser to access your new SoftPak.

FIG. 4C

SoftPak Director 

User License Level – This is the user license level your Instagate EX is currently licensed for. Any SoftPaks that do not have their own user license level will automatically be subscribed at this level. You may select a new user license level to upgrade/downgrade your system by selecting the new level from the pulldown menu and pressing the "Change" button. Any SoftPaks you are currently subscribed to will have their montly fees adjusted accordingly.

25 Users  110
Change  112

Anti-Virus – Provides inspection of inbound and intra-office email attachments for known computer viruses.

Unsubscribe 106b

Firewall Policy Manager – Provides granular management of firewall policy and additional logging capabilities.
Subscribe for only: *115.00/yr*

Subscribe 106c

Internet Server – Web, FTP, and Domain Name servers.
Subscribe for only: *115.00/yr*

Subscribe 106c

Modem Communication – RAS and Failover support.
Subscribe for only: *175.00/yr*

Subscribe 106c

SiteFilter – Provides URL web site filtering and blocking based on a dynamic URL database.
Subscribe for only: *540.00/yr*

Subscribe 106c

FIG. 4D

SYSTEM AND METHOD FOR MANAGING APPLICATION SERVICE PROVIDERS

FIELD OF THE INVENTION

The present invention relates to software management systems and, more particularly, to systems and methods for selecting, ordering, installing, managing, updating, and if necessary, uninstalling software applications provided to an entity by one or more application service providers (ASPs) or other sources.

BACKGROUND OF THE INVENTION

Recently, substantial attention has been directed to the field of software management tools. One reason for this is that many vendors or purveyors of software now distribute their products directly to customers via wide area networks such as the Internet. Such vendors often are referred to as "Application Service Providers" or "ASPs." Generally, businesses use ASPs as a means for outsourcing information technology (IT) functions to specialists. Moreover, rather than purchasing expensive software, high-powered computers, high-end telecommunications equipment, and the like, companies often now choose to rent or lease applications from ASPs, and they often access or use selected applications through the Internet. While this model allows companies to achieve significant savings from a hardware and software purchasing and maintenance perspective, the model may introduce significant management issues, where for example, multiple ASPs provide applications to a single entity.

Accordingly, it is believed that businesses may find systems, methods, and applications for managing ASP relationships to be quite useful.

SUMMARY OF THE INVENTION

In one particularly innovative aspect, the present invention is directed to systems and methods for enabling a company to manage its relationships with one or more ASPs, or other software sources. In one presently preferred embodiment, an applications management server may be deployed within a company and used to interface with a master database server and the servers of one or more ASPs. The interface preferably occurs via the Internet, thus enabling a personal computer, web computer, or other network appliance coupled to the management server to interact with the master database server and the servers of the ASPs.

For example, using a browser application provided on a personal computer, it is possible interact with the management server and query the master database server to identify those applications, services, and subscriptions that are available, as well as those which are currently being utilized within a company. Further, through the use of an appropriate graphic user interface (GUI) a user of the browser may add selected applications, functions, or capabilities to the company network, and the user may remove applications, functions, or capabilities that are no longer needed by the company. The result of these actions may be communicated, for example, through the Internet to the master database server, and the master database server may thereafter interact with any relevant ASP servers to enable or disable selected applications, functions, or features. In addition, the master database server may provide electronic messages to any personnel having responsibility for tasks necessary to carry out a transaction or complete an action.

Accordingly, it is an object of the invention to provide improved systems, methods, and applications for managing ASP relationships over a wide area network, such as the Internet.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIGS. 4(a)–4(d) comprise a series of screen images that may be used by a GUI in accordance with the present invention.

DETAILED DESCRIPTION

Figure 1:
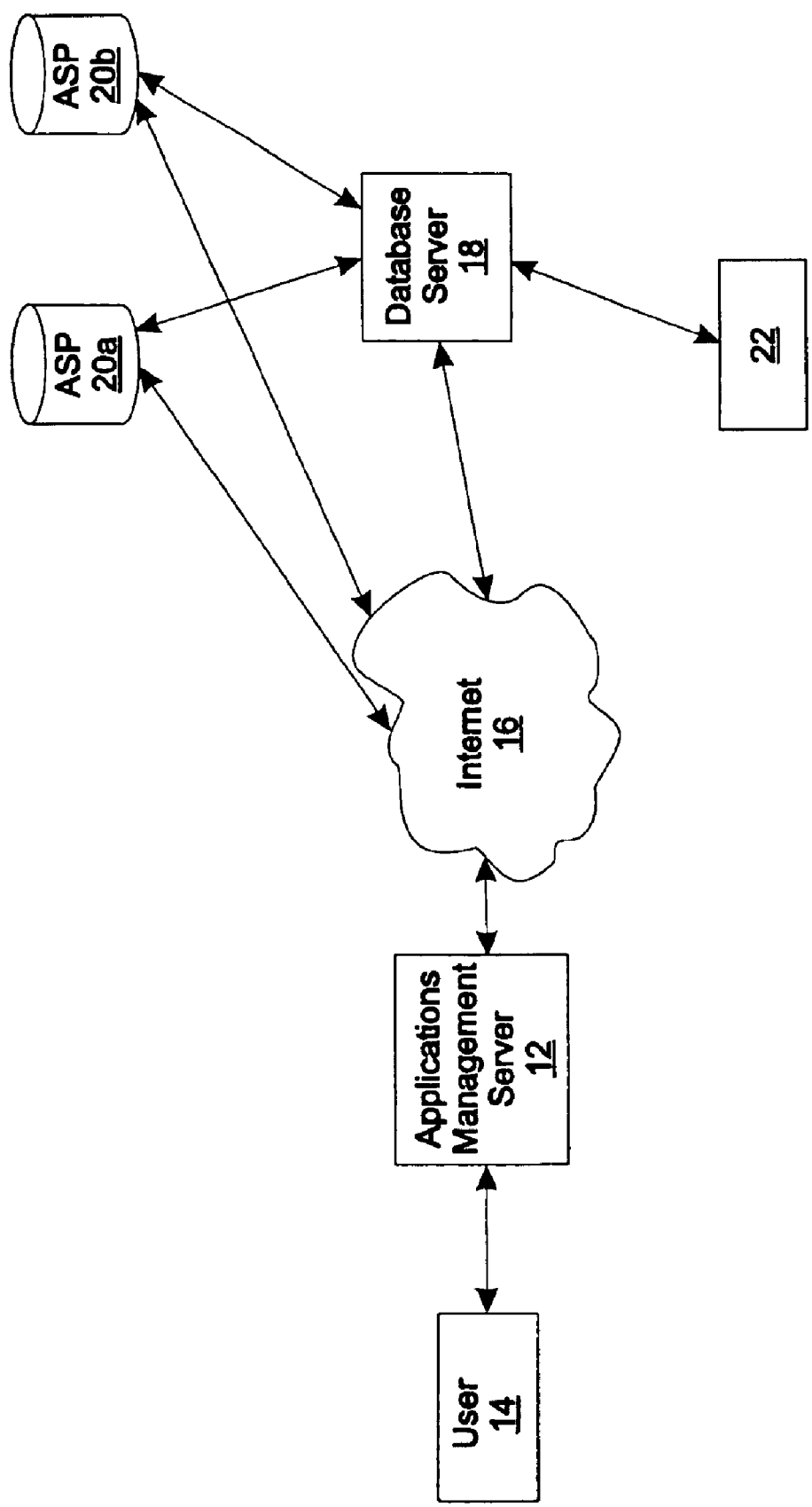
FIG. 1 is a block diagram illustrating a system for managing ASP and other relationships over a wide area network, such as the Internet, in accordance with a preferred form of the present invention.

As shown in FIG. 1, in one presently preferred form, a system 10 for managing ASP and other relationships over a wide area network 16, such as the Internet, may comprise an applications management server 12, a personal computer, web computer, or other network appliance 14, a wide area network 16, a master database server 18, and a plurality of ASP servers 20(a) and 20(b). The applications management server 12 and the master database server 18 may be implemented using standard PC compatible hardware including, for example, a 400 MHz CELERON® processor manufactured by Intel Corporation. However, in one presently preferred form, the master database server 18 comprises a 733 MHz PENTIUM® processor manufactured by Intel Corp., 512 MB of RAM (or other suitable memory), and AMI Megaraid SCSI RAID hardware configured to make three 9 G disks look like one 18 G disk in RAID5 mode. The applications management server 12 preferably comprises a 500 MHz CELERON® processor manufactured by Intel Corp., 64 MB of RAM (or other suitable memory), and a 10.2 GB hard disk drive.

The applications management server 12 and master database server 18 may be coupled to the Internet 16 via dial up, ISDN, DSL, or any other protocol that supports TCP/IP. The master database server 18 also may employ database management software available from any of a number of vendors including Microsoft Corp., Oracle Corp., and Sleepy Cat, Inc.

The applications management server 12 may be deployed within a company and used to interface with the master database server 18 and the servers of one or more ASPs 20(a) and 20(b). The interface preferably occurs via the Internet 16, thus enabling a personal computer, web computer, or other network appliance 14 coupled to the applications management server 12 to interact with the master database server 18 and the servers of the ASPs 20(a) and 20(b).

For example, using a browser application (not shown) provided on the personal computer 14, it is possible to interact with the applications management server 12 and query the master database server 18 to identify those applications, services, and subscriptions that are available, as well as those which are currently being utilized within a company. Further, through the use of an appropriate graphic user interface (GUI), a user of the browser (not shown) may add selected applications, functions, or capabilities to the company network, and the user may remove applications, functions, or capabilities that are no longer needed by the company. The result of these actions may be communicated, for example, through the Internet 16 to the master database server 18, and the master database server 18 may thereafter interact with any relevant ASP servers 20(a) and 20(b) to enable or disable selected applications, functions, or capabilities. In addition, the master database server 18 may provide electronic messages to any personnel 22 having responsibility for tasks necessary to carry out a transaction or complete an action.

Figure 2:
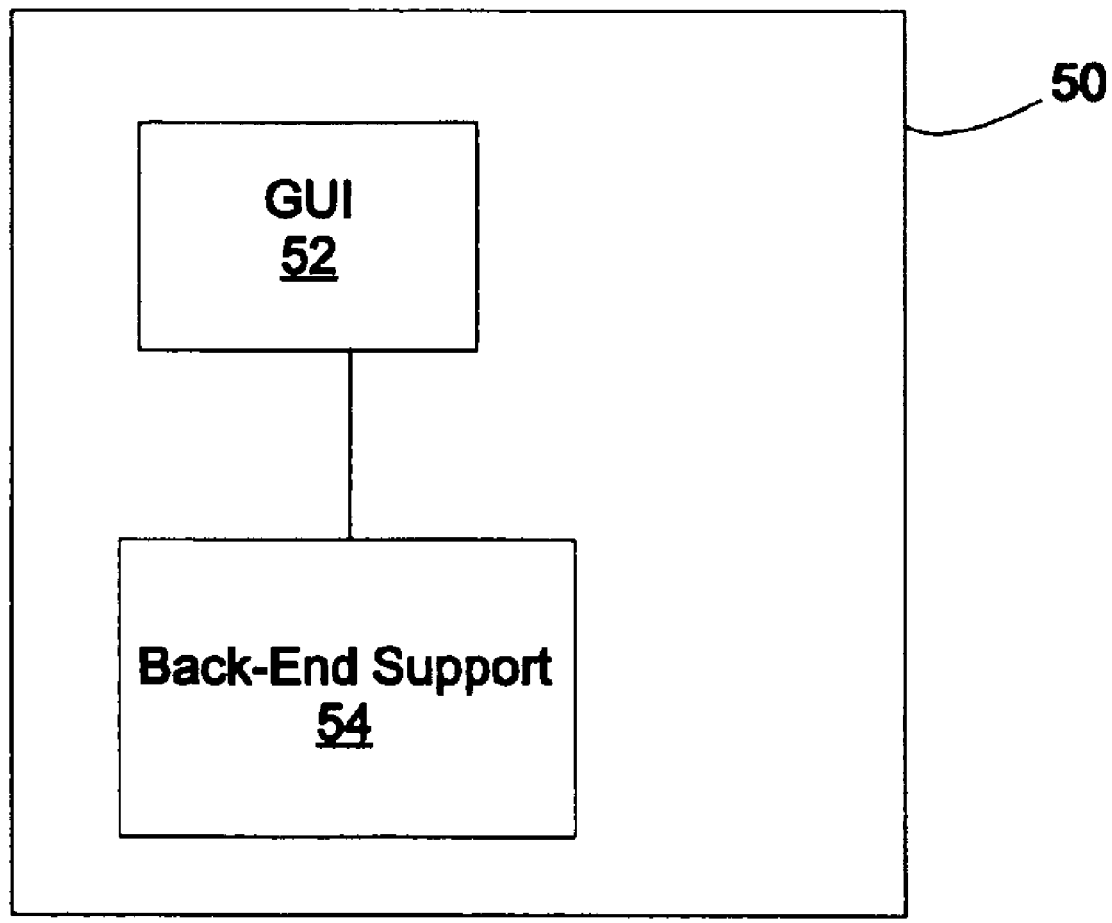
FIG. 2 is a block diagram illustrating the components of a software subscription management module in accordance with a preferred form of the present invention.

In one presently preferred embodiment, a software subscription management module 50, shown in FIG. 2, will be configured on the applications management server 12, and the software subscription management module 50 may comprise a graphic user interface (GUI) submodule 52 and a backend support submodule 54. As will be described in more detail below, using a typical browser application, such as Microsoft Explorer® or Netscape Navigator®, the user (not shown) of the personal computer 14 may access the GUI submodule 52 provided on the applications management server 12, and by interfacing with the GUI, may view a list of applications, services, or capabilities that are provided on a network (not shown) of a company, as well as, a list of applications, services, or capabilities that are available for use by the network. The user also may access historical data relevant to the network using the GUI.

In a preferred form, all queries issued by the applications management server 12 are in the form of hypertext transfer protocol (HTTP) requests and include a unique ID for the management applications server as part of a Uniform Resource Locator (URL). Those skilled in the art will appreciate, however, that other communications protocols, such as file transfer protocol (FTP) or hypertext transfer protocol secure (HTTPS), also may be used for queries issued by the applications management server 12.

Figure 3:
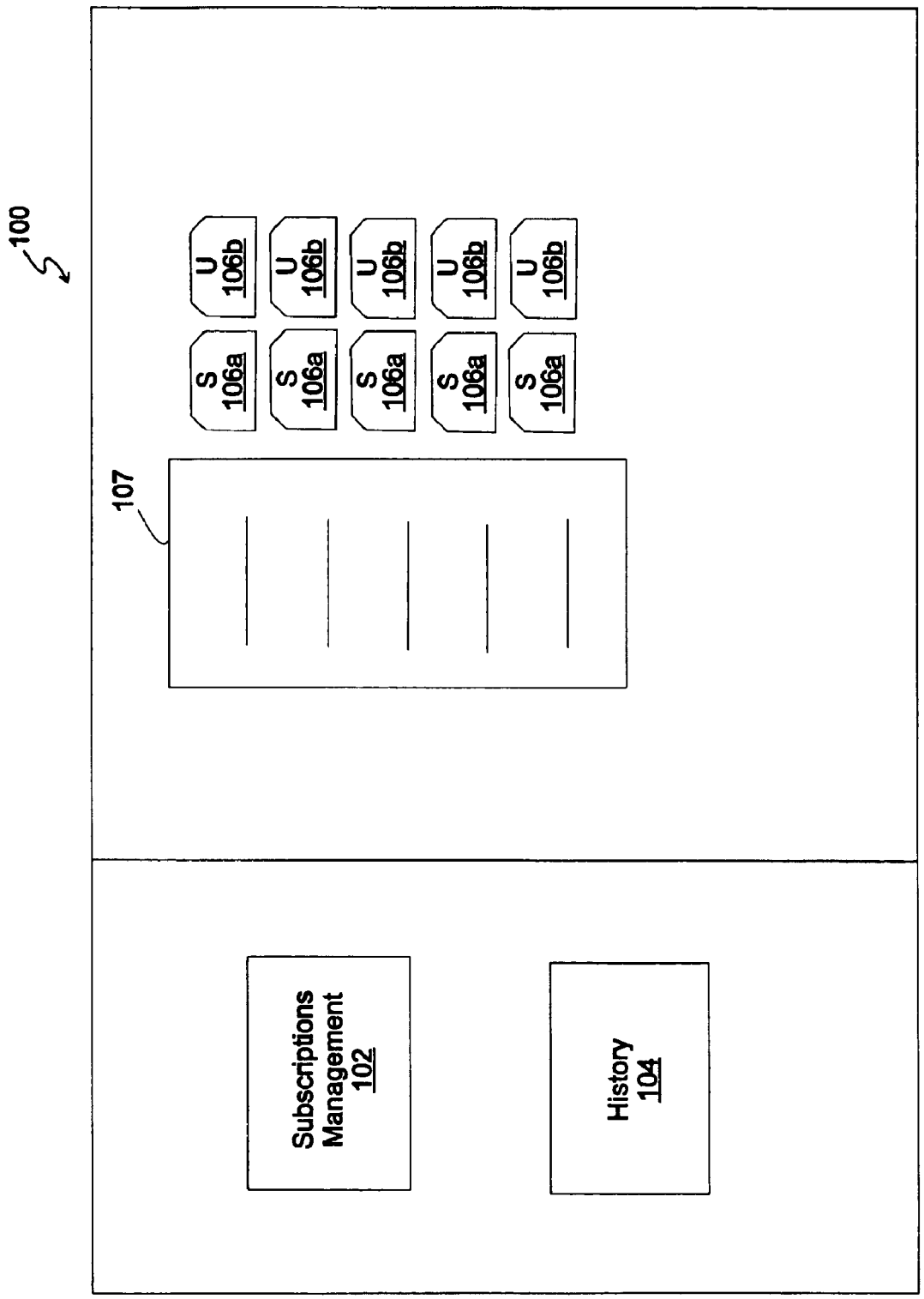
FIG. 3 is an illustration of a graphic user interface (GUI) used in accordance with the present invention.

Turning now to a description of the GUI, the GUI 100, shown in FIG. 3, preferably includes a subscription management item 102 and, if desired, a subscriptions history item 104. The subscription management item 102 may be used to retrieve a display of all applications, services, and capabilities that are available to the network, together with a plurality of "subscribe" and "unsubscribe" buttons 106(a) and (b) for enabling a user to select one or more offerings for use by the system. The subscriptions history item 104 may be used to display, for example, a chronological history of those offerings that have been utilized by the network in the past.

Using the GUI 100, a system administrator 14 can retrieve a list 107 of available applications or services, and using the displayed list, the administrator 14 can select desired items to be installed on the applications management server 12, or other servers (not shown), within a local area network (LAN) or wide area network (WAN). The administrator also may view a history of all applications or services that have been selected for use within network over a prescribed period of time.

Preferably, the GUI 100 issues back-end commands that will cause any necessary HTTP requests to be generated, and information returned from the applications management server 12 or the master database server 18 will be parsed, formatted, and sent to a standard output. The GUI 100 may then read in the output from the back-end process and display the information to the administrator 14 along with any necessary interactive items, such as the subscribe and unsubscribe buttons 108(a) and (b) described above.

Preferably, whenever a list 107 of available services or applications is presented to an administrator, the list 107 will include all available applications or services, and the administrator 14 will be allowed to select services or applications for subscription or cancellation. The history item 104 may be used to display a chronological history of selected services or applications.

Turning now to FIGS. 4(a)–(d), in accordance with another preferred form of the present invention the GUI 100 may include a series of screen images that include a field 111 denoting the number of application licenses 110 that may be required for a given enterprise and a list of services or applications 107 that are available to the enterprise. If it is desired to change the number of licenses required by the enterprise, a user of the system may simply click on a change button 112 to access, for example, a pulldown menu (not shown) offering different licensing levels. The user also may initiate a subscription sequence by clicking on a subscribe button 106(a) provided adjacent one of the application listings. Following initiation of the subscription sequence, the user may be presented with another screen 103, which includes a download now button 114 for initializing an application download sequence and an unsubscribe button 106(b) adjacent the selected application. If the user clicks on the download now button 114 an application download sequence will be initiated, and the user may be presented with a new screen 105 including an install now button 116. By clicking on the install now button, the user may cause the selected application to be installed on the applications management server 12 or, if desired, on another server (not shown) included within the users LAN. Lastly, one the selected application has been installed, the user may be presented with a screen 109 that includes a check icon 118 adjacent the service that has been selected and installed upon the user's network.

Table 1, below, provides an exemplary representation of the components comprising the subscriptions management item 102 (shown in FIG. 3), wherein "xxx" comprises the name of the service or application that will be subscribed to or unsubscribed from.

TABLE 1

| Form Field Name | Form Field Type | Corresponding ti.conf Variable | Appears in Form |
|---|---|---|---|
| subscribe_xxx | Submit button | SUBSCRIPTION_ADD_SERVICES | SnapIn.php |
| unsubscribe_xxx | Submit button | SUBSCRIPTION_ADD_SERVICES | SnapIn.php |

Turning now to a description of the backend support module 54 and related system programs, the backend support module 54 employs several scripts and routines described below to enable selection or deselection of services or applications in response to instructions received from the GUI 100.

In one preferred embodiment, a sysSubscriptionQuery routine, comprising a perl script, is used to create http queries for Peabody Software service APIs using inputs to the script and two ti.conf variables. A returned value from the query is sent to the standard output (not shown) of the GUI 100.

A sysSubscriptionQuery: System Calling routine passes an API name as a first parameter and, if necessary, a service identifier as a second parameter. Thus, the call does not require a service identifier. An exemplary call for a service listing may read as follows: /use/local/ti/bin/sysSubscriptionQuery GetServices. Whereas, a call to subscribe to a particular service requires an identification of the service to be subscribed to and may read as follows: /use/local/ti/bin/sysSubscriptionQuery Subscribe 100.

A sysSubscriptionQuery: System Operation routine enables the hostname of a server (not shown) to query and the path to an API script to be pulled from the ti.conf variable SUBSCRIPTION_QUERY_HOST_PATH. The API passed to this program is used as part of the name of the script to call on the server (not shown). The query to the script preferably comprises a DeviceKey, stored in SERIAL_NUMBER, and optionally a ServiceID, e.g., the name of the service to be subscribed to. Preferably, a HTTP::Request object is created with a GET method, and an LWP::UserAgent request is made using the HTTP::Request object. The response to the request is stored in a HTTP::Response object. If the request is successful the content of the response is sent to the standard output (not shown) of the GUI 100. Otherwise, an error is printed as a HTML document. Those skilled in the art will appreciate that in some circumstances the Response object may be parsed and formatted prior to being printed to the standard output (not shown).

In one preferred form, a SusUnsubscribe script uninstalls any RedHat Package Managers (RPMs) associated with a service being unsubscribed, and a SetServiceDisabled request is sent to the subscription server. In addition, a susUnsubscribe:System Calling script is called with the name of the service to unsubscribe. The script may read as follows: /use/local/ti/bin/sysUnsubscripe 100.

A susUnsubscribe:System Operation script may be used to check a repository directory in /usrlocal/redphish/snapin for a directory that matches a servicename. If there is no matching service name, then an error is reported, and the service is not unsubscribed. If the directory exists, a rpm -e command may be issued against each rpm in the directory. After the packages are uninstalled the directory and the files within are deleted.

A sysUpdateSubscriptions script may be used to check for a SUBSCRIPTION_ADD_SERVICES array in ti.conf and for each service listed may download the relevant files and install them on the applications management server 12.

To perform service installations, a sysUpdateSubscriptons: System Operation routine is preferably utilized. Thus, for each service listed in SUBSCRIPTION_ADD_SERVICES a GetServiceLocation query is made to the subscription server. The information returned from the server is used to transfer (via ftp) the RPMs to a Peabody system. Once all of the RPMs for a service have been downloaded they may be installed with the following command: rpm —U*.rpm. If any of the RPM packages fail to load, then none of them will be loaded. When a loading failure occurs, two additional loading attempts will be made to download and install the relevant files, before a given loading process will be abandoned, and installation of the next service will be initiated. If all the packages install then the service name will be removed from the SUBSCRIPTION_ADD_SERVICES array.

Table 2, below, sets forth a preferred set of data structures that may be used in accordance with the present invention.

TABLE 2

Statement format with default values (if any) and description
STATEMENT=<arg1>m<arg2>m <arg3>,?,<argN>
Where <arg1>is?.
SUBSCRIPTION_QUERY_HOST_PATH=<URL>
Where <URL> is the hostname and path to the script that process the queries. This is set the first time the subscription software is run.
Default: blank
SUBSCRIPTION_ID=<ID>
Where <ID> is the numerical id of the machine. This is set when the subscription software is used for the first time.
Defaults: blank
SUBSCRIPTION_ADD_SERVICES=<service id>
This array is used to store the services selected from the GUI that need to be installed during the next update.
SUBSCRIPTION_INTERVAL=<number of days>
The number of days between updates.
Default: blank In one presently preferred form, the backend support module utilizes a HTTP API for Software Subscriptions Management. Each API call preferably is in the form of a HTTP query with parameters passed as key-value pairs, and each response preferably is a list of key-value pairs in plain text form. The API call preferably has one of the two following formats:
http://<host>/<path>/<API>/.cgi?DeviceID=<DeviceID> [&ServiceID=<Number> or
http://<host>/<path>/<GetServiceLocation.cgi?ServiceID=<Number>
where: <host> identifies the software subscription server, and the host's name is stored in SOFTWARE_UPDATE_HOST; <DeviceID> is a unique number identifying the machine and may be the serial number of, for example, the applications management server 12 or the MAC address of the Ethernet card of the server 12 that is coupled to the Internet; and <Number> is the numeric identifier of the requested service. It will be appreciated by those skilled in the art that the <DEVICE_ID> also may be a series of numbers followed by a checksum, as would be the case with a typical InstaGate machine of the type that is well known in the art.

As an example, the request set forth below could represent a Subscribe request from a machine with an Ethernet hardware address of 00:A0:CC:69:55:B2 for service 1040—a tax software package. In the example, the subscription server is located at subscriptions.esoft.com, the scripts are in cgi.bin, and the software is located on blades.esoft.com in the directory /home/software/tax. In addition, the software is accessible with the password sn2ggl3.
Request:
http://subscriptions.esoft.com/cgi-bin/Subscribe.cgi?DeviceID+00A0CC6955B2&ServiceID=1040
Result:
    Result: 1
Request:
http://subscriptions.esoft.com/cgi-bin/GetServiceLocation?ServiceID=1040
    Result:
        Hostname:blades.esoft.com
        Path:tax Username:softname Password:sn2ggl3

As explained above, in a preferred form a GetServices request will retrieve a list of available services that can be subscribed to by a requesting machine, and it will indicate which services are already subscribed to. The parameters and return values used in accordance with a GetServices request may comprise those set forth in Tables 3(a) and 3(b), below.

TABLE 3(a)

GetServices: Parameters

| Name | Type | Description |
| --- | --- | --- |
| DeviceKey | Hex Number | Composed of the digits of the MAC address of eht1 |

TABLE 3(b)

GetServices: Return Values

| Name | Type | Description |
| --- | --- | --- |
| ServiceID | Number | a unique identifier for the service |
| ServiceTitle | String | a brief title for the service |
| ServiceDesc | String | a brief description of the service |
| ServiceFee | String | How much the service will cost. |
| Subscribed | Number | Boolean value - 1 for subscribed, 0 for not subscribed |
| StartDate | mm/dd/yy | Date subscription started if already subscribed. |
| Enabled | Number | Boolean value - 1 for enabled, 0 for disabled |
| CoreService | Number | Boolean value - 1 indicates the service is a core service. If Enabled is 0 for a core service then disable the system. |
| Available | Number | Boolean value - 1 indicates the service is available if it is a 0 then the installed service must be disabled. This record is optional. |

The parameters and return values used with a Subscribe request are set forth in Tables 4(a) and 4(b), and the parameters and return values used within an Unsubscribe request are set forth in Tables 5(a) and 5(b), below.

TABLE 4(a)

Subscribe: Parameters

| Name | Type | Description |
| --- | --- | --- |
| DeviceKey | Hex Number | Composed of the digits of the MAC address of eth1 |
| ServiceID | Number | A unique identifier for service |

TABLE 4(b)

Subscribe: Return Values

| Name | Type | Description |
| --- | --- | --- |
| Result | Number | Boolean value - 1 if successfully subscribed, 0 otherwise |

TABLE 5(a)

Unsubscribe: Parameters

| Name | Type | Description |
| --- | --- | --- |
| DeviceKey | Hex Number | composed of the digits of the MAC address of eth1 |
| ServiceID | Number | a unique identifier for the service |

TABLE 5(b)

Unsubscribe: Return Values

| Name | Type | Description |
| --- | --- | --- |
| Result | Number | Boolean value - 1 successfully unsubscribed, 0 otherwise |

The parameters and return values used with a GetContactInfo request are set forth in Tables 6(a) and 6(b), below. However, when a subscription server is successfully contacted, "NextDay" and "Time" fields stored within the memory (not shown) of the subscriptions management server 12 preferably will dictate when to contact the server again. If the applications management server 12 fails to contact a server at a specified time, then the applications management server 12 preferably will attempt to establish contact three additional times over the course of the next fifteen minutes, e.g., once every 5 minutes. If all three retries fail, the device should give up and try again in the number of days specified in an "Interval" field, but at the same designated "Time".

TABLE 6(a)

GetContactInfro: Prameters

| Name | Type | Description |
| --- | --- | --- |
| DeviceKey | Hex Number | Composed of the digits of the MAC address of eth1 |

TABLE 6(b)

GetContactInfo: Return values

| Name | Type | Description |
| --- | --- | --- |
| NextDay | mm/dd/yyyy | The next day to contact the back office |
| Time | hh:ss | The time of day (in 24 hour time) to query the back office |
| Interval | Number | The frequency in days to query the back office |
| URLBase | String | The URL to be used for the next update/verification. The URL contains the protocol, host, and path up to the beginning of the API portion. |

The parameters and return values used with a SetService Enabled request are set forth in Tables 7(a) and 7(b), below.

TABLE 7(a)

SetServiceEnabled: Parameters

| Name | Type | Description |
| --- | --- | --- |
| DeviceKey | Hex Number | Composed of the digits of the MAC address of eth1 |
| ServiceID | Number | A unique identifier for the service |

TABLE 7(b)

SetServiceEnabled: Return Values

| Name | Type | Description |
| --- | --- | --- |
| Result | Number | Boolean value 1 if set enabled successfully, 0 otherwise |

The parameters and return values used with a SetService-Disabled request are set forth in Tables 8(a) and 8(b), below.

TABLE 8(a)

SetServiceDisabled: Parameters

| Name | Type | Description |
| --- | --- | --- |
| DeviceKey | Hex Number | composed of the digits of the MAC address of eth1 |
| ServiceID | Number | a unique identifier for the service |

TABLE 8(b)

SetServiceDisabled: Return Values

| Name | Type | Description |
| --- | --- | --- |
| Result | Number | Boolean value 1 if set disabled successfully, 0 otherwise |

The parameters and return values used with a GetService-Location request are set forth in Tables 9(a) and 9(b), below.

TABLE 9(a)

GetServiceLocation: Parameters

| Name | Type | Description |
| --- | --- | --- |
| ServiceID | Number | a unique identifier for the service |
| DeviceKey | Hex Number | The unique identifier for the machine. |

TABLE 9(b)

GetServiceLocation: Return Value

| Name | Type | Description |
| --- | --- | --- |
| Hostname | String | Name identifier for the service |
| Path | String | Path from login directory to software |
| Username | String | Username to use to log in with |
| Password string | String | Password for the Username |

In another aspect, the GUI 100 (or system front end) may use the support files listed in Table 10(a), below, and the backend support module may use the support files listed in Table 10(b), below.

TABLE 10(a)

| /Path/Filename | Description |
| --- | --- |
| Ti/__Support/Snapin.php | This script displays the available service and its current state. |

TABLE 10(b)

| /Path/Filename | Description |
| --- | --- |
| /sysUnsubscribe | Script that unsubscribes to the specified service |
| sysSubscriptionQuery | Creates the URI for the query, issues the query and sends the results back. |
| SysUpdateSubscritions | Script that downloads and installs subscribed software |

Those skilled in the art will appreciate that, in addition to the systems and methodologies descried herein, the present invention is directed to the computer software applications, programs, protocols, routines, and instructions (collectively "computer programming instructions") that are used to implement the above-described features and functions. Computer programming instructions preferably are stored within memory of the system, and may be received or transmitted via a communications interface. When executed by a processor (not shown) of the applications management server 12 or database management server 18, the programming instructions will enable the system 10 to perform various methods and processes in accordance with the present invention and, therefore, represent controllers of the system 10 and, potentially, any ASP servers 20(*a*) and 20(*b*) that may be included within the system 10.

In this document, the term "computer program product" is used to refer to any media that may be used to provide programming instructions or data to the system 10, or to any server or processor within the system 10, through for example, the Internet. Examples of such media include any memory products used by or within the system 10, any storage drives or devices (whether fixed or removable) used by or within the system 10, and any signals that may be transmitted to, from, or within the system 10.

Because the invention is susceptible to various modifications and alternative forms, specific examples thereof have been shown in the drawings and are herein described in detail. It should be understood, however, that the invention is not to be limited to the particular forms or methods disclosed, but to the contrary, the invention should encompass all modifications, alternatives, and equivalents falling within the spirit and scope of the appended claims.

What is claimed is:

1. A system for managing software applications, the system comprising:

a first application service provider configured to provide at least a first software application;

a second application service provider configured to provide at least a second software application;

a subscription management server in communication with the first application service provider and the second application service provider, the subscription management server configured to store at least an identifier for the first software application and the second software application; and an application management server in communication with the subscription management server, the application management server configured to request the subscription management server for access to at least one of the first software application and the second software application;

wherein the subscription management server is configured to provide the application management server access to at least one of the first software application and the second software application.

2. A method for managing software applications, the method comprising:

storing, at a subscription management server, a list of available software applications available from a plurality of application service providers;

storing an indication of which software application corresponds to which of the plurality of application service providers;

receiving, at the subscription management server, a request to view at least a portion of the available software applications;

initiating, from the subscription management server, display of a list that includes at least a portion of the available software applications;

receiving, at the subscription management server, a request to subscribe to one of the available software applications;

identifying, at the subscription management server, which application service provider corresponds to the requested software application; and providing access to the requested software application;

wherein providing access to the requested software application comprises:

receiving, at an application management server, the software application from the application service provider for local installation.

3. The method of claim 2, wherein providing access to the requested software application comprises:

initiating, at the subscription management server, a subscription sequence with the application service provider for the requested software application.

4. The method of claim 2, wherein providing access to the requested software application comprises:

initiating a download sequence from the identified application service provider.

5. A method for managing software applications, the method comprising:

storing, at a subscription management server, a list of available software applications available from a plurality of application service providers;

storing an indication of which software application corresponds to which of the plurality of application service providers;

receiving, at the subscription management server, a request to view at least a portion of the available software applications;

initiating, from the subscription management server, display of a list that includes at least a portion of the available software applications;

receiving, at the subscription management server, a request to subscribe to one of the available software applications;

identifying, at the subscription management server, which application service provider corresponds to the requested software application; and providing access to the requested software application;

wherein providing access to the requested software application comprises:

receiving, at an application management server, the software application from the subscription management server provider for local installation.

6. The method of claim 5, wherein providing access to the requested software application comprises:

initiating, at the subscription management server, a download sequence from the identified application service provider.

7. The method of claim 5, further comprising:

storing, at the subscription management server, a list of software applications to which access has been provided.

8. A method for managing software applications, the method comprising:

storing, at a subscription management server, a list of available software applications available from a plurality of application service providers;

storing an indication of which software application corresponds to which of the plurality of application service providers;

receiving, at the subscription management server, a request to view at least a portion of the available software applications;

initiating, from the subscription management server, display of a list that includes at least a portion of the available software applications;

receiving, at the subscription management server, a request to subscribe to one of the available software applications;

identifying, at the subscription management server, which application service provider corresponds to the requested software application; and providing access to the requested software application;

wherein providing access to the requested software application comprises:

receiving, at an application management server, access to the software application that is hosted by the application service provider.

* * * * *

(12) INTER PARTES REEXAMINATION CERTIFICATE (0203rd)
United States Patent
Hartman et al.

(10) Number: US 6,961,773 C1
(45) Certificate Issued: Nov. 2, 2010

(54) SYSTEM AND METHOD FOR MANAGING APPLICATION SERVICE PROVIDERS

(75) Inventors: Robert Charles Hartman, Aurora, CO (US); John Elton Dietrich, II, Longmont, CO (US); Jeffrey James Finn, Englewood, CO (US); Rodney Dean Holm, Evergreen, CO (US)

(73) Assignee: eSoft, Inc., Broomfield, CO (US)

Reexamination Request:
No. 95/000,211, Jan. 8, 2007

Reexamination Certificate for:
Patent No.: 6,961,773
Issued: Nov. 1, 2005
Appl. No.: 09/766,469
Filed: Jan. 19, 2001

(51) Int. Cl.
*H04L 29/08* (2006.01)
*H04L 29/06* (2006.01)

(52) U.S. Cl. .................. 709/227; 717/168; 717/171
(58) Field of Classification Search .................. None
See application file for complete search history.

(56) References Cited

U.S. PATENT DOCUMENTS

| | | |
|---|---|---|
| 4,791,565 A | 12/1988 | Dunham et al. |
| 4,815,030 A | 3/1989 | Cross et al. |
| 4,937,863 A | 6/1990 | Robert et al. |
| 4,992,940 A | 2/1991 | Dworkin |
| 5,023,907 A | 6/1991 | Johnson et al. |
| 5,138,712 A | 8/1992 | Corbin |
| 5,155,809 A | 10/1992 | Baker et al. |
| 5,204,897 A | 4/1993 | Wyman |
| 5,283,868 A | 2/1994 | Baker et al. |
| 5,329,619 A | 7/1994 | Page et al. |
| 5,341,477 A | 8/1994 | Pitkin et al. |
| 5,371,532 A | 12/1994 | Gelman et al. |
| 5,375,206 A | 12/1994 | Hunter et al. |
| 5,388,215 A | 2/1995 | Baker et al. |
| 5,410,703 A | 4/1995 | Nilsson et al. |
| 5,423,003 A | 6/1995 | Berteau |
| 5,438,508 A | 8/1995 | Wyman |
| 5,440,744 A | 8/1995 | Jacobson et al. |
| 5,442,771 A | 8/1995 | Filepp et al. |
| 5,522,041 A | 5/1996 | Murakami et al. |
| 5,539,822 A | 7/1996 | Lett |
| 5,548,722 A | 8/1996 | Jalalian et al. |
| 5,553,241 A | 9/1996 | Shirakihara |
| 5,557,747 A | 9/1996 | Rogers et al. |
| 5,579,222 A | 11/1996 | Baines et al. |
| 5,581,764 A | 12/1996 | Fitzgerald et al. |
| 5,602,991 A | 2/1997 | Berteau |

(Continued)

FOREIGN PATENT DOCUMENTS

| | | |
|---|---|---|
| CA | 2268683 | 10/2000 |
| EP | 0332304 | 9/1989 |
| WO | WO9220022 | 12/1992 |
| WO | WO0072185 | 11/2000 |
| WO | WO0101313 | 1/2001 |

OTHER PUBLICATIONS

"Office Action in U.S. Appl. No. 11/154,891," Dec. 30, 2009, 34 Pages.

Neugeboren O'Dowd PC, "Response to Office Action in U.S. Appl. No. 11/154,891," filed Apr. 14, 2009" 29 Pages.

"Office Action Response in U.S. Appl. No. 11/154,891," filed Sep. 21, 2009, 23 Pages.

(Continued)

*Primary Examiner*—Scott L. Weaver

(57) ABSTRACT

A managed services platform. An applications management server is provided for managing relationships with application service providers and others over a wide area network such as the Internet. The applications management server interfaces with a master database server and the servers of one or more application service providers, or other entities, to facilitate selection and deselection of applications, services, and capabilities that may be available for use by the information technology network of a company.

U.S. PATENT DOCUMENTS

| | | |
|---|---|---|
| 5,642,515 A | 6/1997 | Jones et al. |
| 5,644,718 A | 7/1997 | Belove et al. |
| 5,668,950 A | 9/1997 | Kikuchi et al. |
| 5,671,412 A | 9/1997 | Christiano |
| 5,671,414 A | 9/1997 | Nicolet |
| 5,678,007 A | 10/1997 | Hurvig |
| 5,680,548 A | 10/1997 | Trugman |
| 5,680,549 A | 10/1997 | Raynak et al. |
| 5,692,129 A | 11/1997 | Sonderegger et al. |
| 5,694,546 A | 12/1997 | Reisman |
| 5,694,550 A | 12/1997 | Takeda et al. |
| 5,699,526 A | 12/1997 | Siefert |
| 5,706,437 A | 1/1998 | Kirchner et al. |
| 5,708,960 A | 1/1998 | Kamisaka et al. |
| 5,724,525 A | 3/1998 | Beyers et al. |
| 5,729,682 A | 3/1998 | Marquis et al. |
| 5,732,219 A | 3/1998 | Blumer et al. |
| 5,748,493 A | 5/1998 | Lightfoot et al. |
| 5,748,897 A | 5/1998 | Katiyar |
| 5,757,925 A | 5/1998 | Faybishenko |
| 5,758,068 A | 5/1998 | Brandt et al. |
| 5,761,499 A | 6/1998 | Sonderegger |
| 5,761,662 A | 6/1998 | Dasan |
| 5,764,914 A | 6/1998 | Goto et al. |
| 5,774,668 A | 6/1998 | Choquier et al. |
| 5,809,237 A | 9/1998 | Watts et al. |
| 5,809,287 A | 9/1998 | Stupek et al. |
| 5,815,665 A | 9/1998 | Teper et al. |
| 5,826,027 A | 10/1998 | Pedersen et al. |
| 5,832,219 A | 11/1998 | Pettus |
| 5,838,911 A | 11/1998 | Rosenhauser et al. |
| 5,845,077 A | 12/1998 | Fawcett |
| 5,859,978 A | 1/1999 | Sonderegger et al. |
| 5,859,979 A | 1/1999 | Tung et al. |
| 5,862,339 A | 1/1999 | Bonnaure et al. |
| 5,867,661 A | 2/1999 | Bittinger et al. |
| 5,881,144 A | 3/1999 | Havens |
| 5,884,039 A | 3/1999 | Ludwig et al. |
| 5,886,991 A | 3/1999 | Guarneri et al. |
| 5,905,860 A | 5/1999 | Olsen et al. |
| 5,918,213 A | 6/1999 | Bernard et al. |
| 5,919,247 A | 7/1999 | Van Hoff et al. |
| 5,925,127 A | 7/1999 | Ahmad |
| 5,930,357 A | 7/1999 | Fukui |
| 5,933,646 A | 8/1999 | Hendrickson et al. |
| 5,937,162 A | 8/1999 | Funk et al. |
| 5,940,074 A | 8/1999 | Britt et al. |
| 5,940,504 A | 8/1999 | Griswold et al. |
| 5,941,949 A | 8/1999 | Pedersen |
| 5,949,975 A | 9/1999 | Batty et al. |
| 5,956,485 A | 9/1999 | Perlman |
| 5,956,490 A | 9/1999 | Buchholz et al. |
| 5,961,586 A | 10/1999 | Pedersen |
| 5,978,848 A | 11/1999 | Maddalozzo, Jr. et al. |
| 5,991,402 A | 11/1999 | Jia et al. |
| 5,995,965 A | 11/1999 | Experton |
| 5,999,740 A | 12/1999 | Rowley |
| 6,006,332 A | 12/1999 | Rabne et al. |
| 6,009,274 A | 12/1999 | Fletcher et al. |
| 6,009,469 A | 12/1999 | Mattaway et al. |
| 6,012,100 A | 1/2000 | Frailong et al. |
| 6,029,201 A | 2/2000 | Neill |
| 6,035,423 A | 3/2000 | Hodges et al. |
| 6,038,595 A | 3/2000 | Ortony |
| 6,044,403 A | 3/2000 | Gerszberg et al. |
| 6,047,323 A | 4/2000 | Krause |
| 6,047,376 A | 4/2000 | Hosoe |
| 6,049,670 A | 4/2000 | Okada et al. |
| 6,049,671 A | 4/2000 | Slivka et al. |
| 6,049,789 A | 4/2000 | Frison et al. |
| 6,052,711 A | 4/2000 | Gish |
| 6,052,725 A | 4/2000 | McCann et al. |
| 6,058,425 A | 5/2000 | White |
| 6,058,426 A | 5/2000 | Godwin et al. |
| 6,073,214 A | 6/2000 | Fawcett |
| 6,078,931 A | 6/2000 | Motoyama |
| 6,088,451 A | 7/2000 | He et al. |
| 6,088,717 A | 7/2000 | Reed et al. |
| 6,101,527 A | 8/2000 | Lejeune et al. |
| 6,101,542 A | 8/2000 | Miyamoto et al. |
| 6,105,063 A | 8/2000 | Hayes, Jr. |
| 6,105,066 A | 8/2000 | Hayes, Jr. |
| 6,108,712 A | 8/2000 | Hayes et al. |
| 6,115,743 A | 9/2000 | Cowan et al. |
| 6,119,162 A | 9/2000 | Li et al. |
| 6,119,163 A | 9/2000 | Monteiro et al. |
| 6,128,644 A | 10/2000 | Nozaki |
| 6,128,776 A | 10/2000 | Kang |
| 6,131,121 A | 10/2000 | Mattaway |
| 6,134,591 A | 10/2000 | Nickles |
| 6,134,593 A | 10/2000 | Alexander et al. |
| 6,138,160 A | 10/2000 | Boies et al. |
| 6,141,759 A | 10/2000 | Braddy |
| 6,144,960 A | 11/2000 | Okada et al. |
| 6,151,643 A | 11/2000 | Cheng et al. |
| 6,154,781 A | 11/2000 | Bolam et al. |
| 6,157,944 A | 12/2000 | Pedersen |
| 6,161,137 A | 12/2000 | Ogdon et al. |
| 6,167,449 A | 12/2000 | Arnold et al. |
| 6,173,316 B1 | 1/2001 | De Boor et al. |
| 6,223,291 B1 | 4/2001 | Puhl et al. |
| 6,256,668 B1 | 7/2001 | Slivka et al. |
| 6,269,456 B1 | 7/2001 | Hodges et al. |
| 6,272,536 B1 | 8/2001 | van Hoff et al. |
| 6,282,709 B1 | 8/2001 | Reha et al. |
| 6,282,711 B1 | 8/2001 | Halpern et al. |
| 6,292,889 B1 | 9/2001 | Fitzgerald et al. |
| 6,327,617 B1 | 12/2001 | Fawcett |
| 6,339,826 B2 | 1/2002 | Hayes et al. |
| 6,374,229 B1 | 4/2002 | Lowrey et al. |
| 6,405,266 B1 | 6/2002 | Bass et al. |
| 6,510,466 B1 | 1/2003 | Cox et al. |
| 6,546,002 B1 | 4/2003 | Kim |
| 6,574,612 B1 | 6/2003 | Baratti et al. |
| 6,615,258 B1 | 9/2003 | Barry et al. |
| 6,658,452 B1 | 12/2003 | Becker et al. |
| 6,782,527 B1 | 8/2004 | Kouznetsov et al. |
| 6,826,398 B1 | 11/2004 | Lagerstrom et al. |
| 6,938,080 B1 | 8/2005 | Kahveci et al. |
| 7,035,918 B1 | 4/2006 | Redding et al. |
| 7,200,632 B1 | 4/2007 | Greschler et al. |
| 7,275,095 B1 | 9/2007 | Lebouill |
| 2001/0047386 A1 | 11/2001 | Domenikos et al. |
| 2001/0049632 A1 | 12/2001 | Rigole |
| 2002/0010776 A1 | 1/2002 | Lemer |

OTHER PUBLICATIONS

Innovative Internet architecture for application service providers, Furht, Borko, Phoenix, Chris, Yin, John, Aganovic, Zijad, Florida Atlantic Univ., Boca Raton, FL, Conference: the 33rd annual Hawaii international conference on System Sciences (H33), Maui, USA, p. 157, 2000.

A framework for ASP–marketplaces, CoopIS 2000: cooperative information systems: Eilat, Sep. 6–8, 2000, Tamm G., Guenther, O.; Etzion Opher Ed.; Scheurmann, Peter Ed., Institute of Information Systems, Humboldt Univ., Spandauer Strasse 1 10178 Berlin, Germany; Conference: Cooperative Information Systems, International Conference, 7, 2009–06, Lecture notes in computer science, 2000, vol. 1901, p. 114–119.

Enabling flexible cross–version interoperability for distributed services, Senivongse, T., Dept of computer engineering, Chulalongkom Univ., Bangkok, Thailand, Conference: Proceedings of the international Symposium on distributed objects and applications, p. 201–10, IEEE Comput. Soc., Los Alamitos, CA Sep. 5–6, 1999, Edinburgh, UK.

Cobalt Networks unveils next generation Qube server appliance; Oct. 11, 2000.

Richard S. Hall, "Agent–based Softwar Configuration and Deployment". Ph.D. Thesis, University of Colorado, 1999.

Richard S. Hall et al., A Cooperative Approach to Support Software Deployment Using the Software Dock: Tech. Rept. CU–CS–871–98, University of Colorado, 1998.

Richard S. Hall et al., "An Architecture for Post–Development Configuration Management in a Wide Area Network", Proceedings of the 1997 Inter. Conf. on Distributed Computing Systems, Baltimore, MD 1997.

Richard S. Hall et al., "The Software Dock: A Distributed, Agent–based Software Deployment System", Tech. Rept. CU–CS–832–97, University of Colorado, Feb. 1997.

Andre van der Hoek et al., "Software Release Management", Proceedings of the 6th European Software Engineering conference, LNCS 1301, Springer, Berlin, 1997.

Andre van der Hoek et al., "Software Release Management", Tech. Rept. CU–CS–806–96, University of Colorado, Aug. 1996.

Novadigm, Inc., "Novadigm Says It's Breakthrough 'Software Manager' Products Can Drastically Reduce Administration Costs By Automatically Personalizing Desktop Software," Network Computer News, Oct. 21, 1997.

Novadigm, Inc., Description of Radia Software Manager, 1998.

Red Hat, Inc., "The Official Red Hat Linux Installation Guide, " Red Hat Linx Version 6.0, 1995–1999, TOC only;Full doc (682 pgs) available online www.redhat.com.

Ram R. Vangala, Michael J. Cripps, Raj G. Varadarajan, "Software Distribution and Management in a Networked Environment," 1992 LISA VI, Long Beach, CA, Oct. 19–23, 1992.

Jeffrey Veen, "That's Marimba, Not Macarena," Wired News, Oct. 21, 1996.

Marimba Products, "Castanet White Paper (including comments re same)," Sep. 30, 1998; Oct. 5, 1998.

Marimba, Inc., "Castanet Developer Documentations, Plugin Development: The Big Picture," 1997, Oct. 5, 1998.

Marimba, "Castanet White Paper," Jun. 9, 1997.

Richard S. Hall, Dennis Heimbinger, Andre Van Der Hoek, and Alexander L. Wolf, "An Architecture for Post–Development Configuration Management in a WAN," Proceedings of the 1997 Inter. Conf. on Distributed Computing Systems, Baltimore, MD, May 1997.

Core Competence and David Strom, Internet @ppliance Industry Report re eSoft InstaGate, 1999–2000.

Core Competence and David Strom, "Technologic InstaGate product report," 1998–1999.

Business Wire, "eSoft Executes Letter of Intent to Acquire Apexx Technology, Inc.; Merger to Create Largest Installed Base of All–in–One Internet Appliances," Business Wire, Nov. 24, 1998.

Technologic, Inc., "Internet Scanner from Internet Security Systems," Nov. 19, 1998.

Technologic, Inc. "Technologic News Release re acquisition by eSoft," 1999.

Technologic, Inc., "Ordering Sheet for InstaGate Product Bundles," 1999.

Technologic, Inc., "Interceptor Firewall Appliance Ordering Information," Dec. 1, 1998.

Internet Security Systems, Inc., "ISS' Internet Scanner Awarded 'Security Product of the Year' at UK Networking Industry Event," Press release, Jun. 29, 1998.

Internet Security Systems, Inc., "Internet Security Systems Internet Scanner wins highly acclaimed SC Award for Third Consecutive Year," Press release, Apr. 18, 2000.

Internet Security Systems, Inc., "ISS Receives Highest Rating from PC/Computing, Internet Scanner Named Market's Most Comprehensive Security Assesment Solution," Press release, Mar. 22, 1999.

Matthew Beale, "eSoft Sold on Linux, Goes With Red Hat," E–Commerce Times, Sep. 16, 1999.

Edge Publishing, "eSoft Unveils Business Blueprint for Future," Work–Group Computing Report, Apr. 12, 1999.

Amy Kukuk, "New Products," Linux Journal, Jan. 1, 1999.

Business Wire, "Apexx Tecnology Announces Strategic Partnership with UUNET Tech., Inc. and NetPartners Internet Solutions, Inc. to Offer Complete Internet Access Solutions," Business Wire, Jun. 30, 1998.

Technologic, Inc., "Product Brochure for Interceptor Firewall Appliance," date unknown.

Technologic, Inc., "Awards Reviews and Certifications for InstaGate Product," date unknown.

Technologic, Inc., "Diagrams relating to InstaGate Product," 1999.

Esoft, Inc., "The Team Internet Model 2500 Architecture and Design," White Paper, date unknown.

Technologic, Inc., "eSoft Completes Merger with Technologic, Inc.," Press release, Sep. 13, 1999.

Business Wire, "eSoft and High–End Networking Firm Alternative Technology Sign Distribution Pact," Business Wire, Feb. 23, 1999.

Mitt Jones, "Thin Servers Plug Growing Businesses Into The Net," Information Week Online, Mar. 27, 2000.

Edge Publishing., "Internet Strategy: eSoft Unveils Business Blueprint for Future; Strategy Leverages Company's Internet and Software Engineering Strengths—Team Internet product line—Company Business and Marketing," Edge: Work–Group Computing Report, Apr. 12, 1999.

Core Competence and David Strom, Inc., "Product Demonstration Report and Presentations," N&I Las Vegas '98 Presentation, 1998.

IDG Books Worldwide, Inc., "Open Source: The Unauthorized White Papers, Chapter 9, The Secret Battlefield: Embedded Systems," 2000.

Business Wire, "Technologic Introduces Version of Interceptor Firewall for use with Microsoft Provy Server," Business Wire, Dec. 2, 1996.

Internet Security Systems, Inc., "Point . . . Click . . . Launch An External Attack On Your Net," Press Release, May 13, 1996.

Tim Clark, "Firewall appliance market takes off," CNET news, Aug. 6, 1997.

Gail James and Miryana Bunic, "All–in–one security appliances," Network World, Apr. 19, 1999.

Peter Galvin, "Firewalls in many flavors," Sunworld, Jan. 1996.

National Software Testing Laboratories, "About to buy a Firewall? Read this first," GCN.com, Aug. 4, 1997.

Weiser Publications, Inc., "Interceptor 2.0—Technologic, Inc's Internet firewall—Brief Article—Product Announcement," Software Magazine, Jul. 1996.

Tim Clark, "Firewall Appliance Market Takes Off," Netsys.com, Aug. 7, 1997.

Keith Schultz, "Interceptor Offers Forewall Flexibility," Information Week Online, Sep. 14, 1998.

Marcus Goncalves, "Firewalls Complete—Chapter 14 'Types of Firewalls and Products on the Market'," McGraw–Hill 1997.

Technologic, Inc., Various product pages relating to Technologic Interceptor product, Mar. 3, 1999.

Business Wire, "eSoft to Begin Trading on Nasdaq," Business Wire, Jul. 30, 1998.

Business Wire, "eSoft Trades on Nasdaq," Business Wire, Aug. 4, 1998.

Business Wire, "eSoft Expands North American Distribution Through Affinity Marketing Deal; New Partner to Sell and Distribute IPAD in Canada," Business Wire, Jan. 21, 1999.

Technologic, Inc. "Various product descriptions and information concerning the InstaGate Product," Feb. 16, 1999.

Technologic, Inc., "eSoft Executes Letter of Intent To Acquire Technologic, Inc.," Press Release, Jul. 22, 1999.

Technologic, Inc., "InstaGate Appliance Delivers Internet Connectivity, Complete with Built–In VPN Capabilities," Press release, Feb. 16, 1999.

Technologic, Inc., "Resellers: Present Your Customers with a Free Network Security Scan," Press release, Feb. 1, 1999.

Technologic, Inc., "Technologic Introduces New Version of Interceptor Firewall Appliance With MS Windows PPTP VPN Support," Press release, Oct. 13, 1998.

Technologic, Inc., "Avdata's Around–the–Clock Network Monitoring Underpins Technologic Managed Forewall Services," Press release, Sep. 25, 1998.

Technologic, Inc., "Technologic Launches VAR Program For Resellers Targeting Small and Mid–Size Businesses," Press release, Aug. 11, 1998.

Technologic, Inc., "Interview Report Tool from Technologic Turns Firewall Data into Valuable Business Information," Press release, Jun. 8, 1998.

Technologic, Inc., "Technologic and AvData Partner to Offer Managed Security Service with 24×7 Monitoring," Press release, May 11, 1998.

Technologic, Inc., "Technologic Announces Japanese Distributor for Interceptor Security Software," Press release, Apr. 21, 1998.

Technologic, Inc., "Technologic and Secure Computing Improve End–User Productivity With New Web Access Control Capabilities in Firewall Appliance," Press release, Apr. 14, 1998.

Technologic, Inc., "New Wizard Included with Technologic's Interceptor Firewall Appliance Reduces Installation Time to Less Than Half an Hour," Press release, Mar. 17, 1998.

Technologic, Inc., "Virtual Private Networks Cutting Electronic Communication Costs by 80%," Press release, Jan. 12, 1998.

Technologic, Inc., "Interceptor Internet Security Appliance Provides Low–Cost Out of the box Firewall Solution," Press release, Jun. 24, 1998.

Netpartners, Inc., "NetPartners Launches Internet Filtering Product for Internet Service Providers," Press release, Apr. 28, 1999.

PR Newswire, Inc., "Esoft Launches Firewall with a Future," Press release, Oct. 16, 2000; PR Newswire, Inc., "Hard times for esoft company that offers internet security shifts focus in bid to become profitable," Press release, Feb. 12, 2001; PR Newswire, Inc., "Esoft Unveils Softpak Director for Instagate Ex; One touch delivery of new applications, services and upgrades," Press release, Nov. 7, 2000.

Dan Goodin, "Network Solutions is threating to sue an influential antispam group if it provides a filter that could be used by hundreds od networks worldwide to block the dominant registrar's email," CNET News.com, Aug. 2, 1999.

Paul Festa, "A controversial antispam tool has acquired legitimacy with the addition of a new subscriber: Hotmail, the 800–pound gorilla of Web–based email," CNET News.com, Nov. 9, 1999.

Internet Security Systems, Inc., "ISS Protects eCommerce Sites from Latest Denial of Service Hacker Attackers, Releases New Versions of SAFEsuite Product Line," Press release, Dec. 28, 1999.

Internet Security Systems, Inc., "Internet Security Systems Ships New Version of Leading Intrusion Detection Software, RealSecure," Press release, Mar. 11, 1999.

Internet Security Systems, Inc., Secure Computing Corporation and ISS Announce Best of Breed Integration of Firewall, Intrusion Detection and Assessment Enhancing E. Security for All Business, Press release, Mar. 15, 1999.

An XML/XSL based software architecture for application service providers (ASPs), Gunther, O., Ricou, O., Pole University, Paris France, Conference: Electronic Commerce and Web Technologies, First International Conference, EXWeb 2000, Proceedings (Lecture Notes in Computer Science vol. 1875), pp. 334–348.

Business models for ASP Marketplaces, Tamm, G., Gunther, O., Inst. of Inf. Syst. Humboldt university, Berlin, Germany, Conference: Proceedings of the 8th European Conference on Information Systems Part: vol. 2, pp. 968–975 vol. 2, Jul. 3–5, 2000, Vienna, Austria.

ASPirin for outsourcing headaches, Pusateri, R., Deloitte Consulting, Kansas City, MO, USA, Telephony, vol. 238, No. 9, pp. 68, 70, 72, 74; Feb. 28, 2000.

Lost among the ASPs, Harney, J., Intelligent Enterprise, vol. 3, No. 3, pp. 26–7, 30–1, 34, Miller Freeman, Feb. 9, 2000.

ASPs: service bureau redux or tectonic change?, Waters, J.K., Application Development Trends, vol 7, No. 1, p. 49–50, 52–3, 101 Communications LLC, Jan. 2000.

System development using application services over the net, Takahashi, Kenji, Emmerich, Wolfgang, Finkelstein, Anthony, Guerra, Sofia NTT, Tokyo, Japan, Conference: 2000 International Conference on Software Engineering, Limerick, Ireland, 19000604–19000611, International Conference on software engineering 2000, IEEE, Los Alamitos, CA.

Internet Security Systems, Inc., "ISS Ships New Version of Market–Leading Internet Scanner, Delivers Enhanced Solution of Managing E–Business Security risks," Press Release, Oct. 5, 1999.

Internet Security Systems, Inc., "ISS Named Market Leader in Network Security Assessment and Intrusion Detection by IDC," Press release, Aug. 9, 1999.

Google groups article Thread regarding "Red Hat Update Agent Packets," Nov. 3, 1999.

Google groups article regarding "documentation for for the 'up2date' update agent?," Oct. 20, 1999.

Google groups article regarding "Tracking RedHat updates without a RedHat support contract," Dec. 16, 1999.
Google groups article thread regarding "just curious about Debian vs RedHat," Oct. 27, 1999.
Google groups article thread regarding "LWN Distributions," Sep. 30, 1999.
Google groups article thread regarding "What is a modern OS feature," Oct. 4, 1999.
Eric Doyle, "Keeping Linux under control (company business and marketing)," Computer Weekly, Oct. 12, 2000.
Proquest Information and Learning, "Open to Acceptance," Electronic Times, Oct. 9, 2000.
Dallas Morning News, "Colorado–based eSoft rides high on popularity of Linux," Dallas Morning News, Dec. 27, 1999.
Warren S. Hersch, "Delivering Linux to E–businesses—Vendor eSoft unveils licensing program," Computer Reseller News, Jul. 5, 1999.
Kris Hudson, "Big–name deal send eSoft stock soaring 700 percent," Boulder Daily Camera, Dec. 29, 1999.
PR Newswire, "Cobalt Networks Unveils Next Generation Qube(TM) Server Appliance," PR Newswire, Oct. 11, 2000.
The Gale Group, "CSN 371–37 Cobalt Readies New Cube," Client Server News (USA), Oct. 16, 2000.
April Jacobs, "Cobalt rolls out new server appliance," Network World, Oct. 12, 2000.
Amy Kukuk, "New Product Review for Applixware 4.4.1," Linux Journal Magazine, Jan. 1, 1999.
Tony Smith, "Apexx commenses channel development drive," The Register, Feb. 10, 1999.
Christine Zimmerman, "Thin Servers: Off–the–shelf–help," (Buyers Guide) Data Communications, Apr. 7, 1999.
Warren S. Hersch, "Delivering Linux To E–Business," Daily News Archive, Jun. 30, 1999.
Core Competence and David Strom, "Embedded Web Servers," Excerpts from N&I Las Vegas Presentation, 1998.
Network Computing, Product Listing and descriptions from Network Computing, Feb. 21, 1997.
Christopher Lindquist, "Internet Appliances Get Real," PC Magazine, May 1, 1999.
Canjex Publishing, Ltd., "eSoft's Team Internet to participate in Albertson's technology grant," Canada Stockwatch, Feb. 16, 1999.
Comtex News Network, "eSoft Releases Free Software Upgrade for its Team Internet Product Line," Sinocast, Feb. 8, 1999.
Comtex News Network, "eSoft's Version 2.5 Software Reduces Set Up to Five Easy Steps With a Ten–Minute Installation," Sinocast, Feb. 8, 1999.
Comtex News Network, "Apexx Technology: New thin server launced," Sinocast, Feb. 4, 1999.
Ziff–Davis Publishing, "MVP Hardware: Desktop Systems & Servers," PC Magazine, Jan. 1, 1999.
Comtex News Network, "Cobalt Qube 2700WG Wins PC Computing's 1998 MVP Award for Small Business Server Category and Innovation of the Year," Sinocast, Nov. 16, 1998.
Ziff Davis Publishing, "New Products: Apexx Team Internet 300 Series," Computer Shopper, Nov. 1, 1998.
Boucher Communications, Inc., "RPG, COBOL Developers Deliver Thin Client Applications," HP Professional, Nov. 1, 1998.
Comtex News Networks, "Good Things in a Small Box," Sinocast, Aug. 10, 1998.
Comtex News Network, "Apexx Technology, Inc. announces Strategic Partnership with UUNET Technologies, Inc. and NetPartners Internet Solutions, Inc. to Offer," Sincast, Jun. 30, 1999.
Comtex News Network, "Team Internet 300 Series Delivers the Tools for Growing Organizations to Control Individual Internet Usage," Sinocast, Jun. 9, 1998.
Andre Kvitka, "Team Internet puts workgroups on the Web," InfoWorld, May 4, 1998.
Comtex News Network, "Apexx Technology Team Internet Becomes the First Internet Access Thin Server to Break the $3000 Barrier for High–Speed Internet Connectivity and productivity," Sinocast, Mar. 12, 1998.
New York Law Publishing Company, "Team Internet 2.0 Connects Networks," Law Technology Products News, Jan. 1998.
Extended Systems, "Extended Systems and Apexx Technology Announce Joint Marketing Program for Internet Access Products," Press Release, Jun. 15, 1998.
Comtex News Network, "Apexx Technology announces Team Internet 2.0, Complete Internet Connectivity and an 'Instant Business Presence' for Networked Small," Sinocast, Dec. 8, 1997.
Ziff Davis Publishing, "Put your Net on the Net," PC Magazine, Oct. 1997.
New York Law Publishing Company, "Apexx Announces Team Internet LAN," Law Technology Product News, Feb. 1997.

US 6,961,773 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 3, 5 and 8 are determined to be patentable as amended.

Claims 4, 6 and 7, dependent on an amended claim, are determined to be patentable.

1. A system for managing software applications *over a network*, the system comprising:
   a first application service provider configured to provide at least a first software application *to one or more clients*;
   a second application service provider configured to provide at least a second software application *to the one or more clients*;
   a subscription management server in communication with the first application service provider and the second application service provider, the subscription management server configured to store at least an identifier for the first software application and the second software application; and
   an application management server in communication with the subscription management server, *wherein* the application management server *is positioned in the network as an intermediary between at least one of the first and second application service providers and the one or more clients, the application management server* configured to request the subscription management server for *an instruction to provide controlled* access to at least one of the first software application and the second software application;
   wherein the subscription management server is configured *to make a determination based on client subscription criteria as to whether* to provide the application management server *controlled* access to at least one of the first software application and the second software application.

2. A method for managing software applications *over a network*, the method comprising:
   storing, at a subscription management server, a list of available software applications available *for controlled access by subscription* from a plurality of application service providers;
   storing an indication of which software application corresponds to which of the plurality of application service providers;
   receiving, at the subscription management server, a request to view at least a portion of the available software applications;
   initiating, from the subscription management server, display of a list that includes at least a portion of the available software applications;
   receiving, at the subscription management server, a request to subscribe to one of the available software applications;
   identifying, at the subscription management server, which application service provider corresponds to the requested software application; and
   providing access to the requested software application;
   wherein providing access to the requested software application comprises:
   receiving, at an application management server, the software application from the application service provider for local installation *by a client, the application management server positioned in the network as an intermediary between at least one of the plurality of application service providers and the client, and*
   requesting the subscription management server for *an instruction based on client subscription criteria to access at least one of the software applications.*

3. The method of claim 2, wherein providing access to the requested software application comprises: initiating, at the subscription management server, a subscription sequence with *one of* the *plurality of* application service provider*s* for the requested software application.

5. A method for managing software applications *over a network*, the method comprising:
   storing, at a subscription management server, a list of available software applications available *for controlled access by subscription* from a plurality of application service providers;
   storing an indication of which software application corresponds to which of the plurality of application service providers;
   receiving, at the subscription management server, a request to view at least a portion of the available software applications;
   initiating, from the subscription management server, display of a list that includes at least a portion of the available software applications;
   receiving, at the subscription management server, a request to subscribe to one of the available software applications;
   identifying, at the subscription management server, which application service provider corresponds to the requested software application; and
   providing access to the requested software application;
   wherein providing access to the requested software application comprises:
   receiving, at an application management server, the software application from the subscription management server provider for local installation *by a client, the application management server positioned in the network as an intermediary between at least one of the plurality of application service providers and the client, and*
   requesting the subscription management server for *an instruction based on client subscription criteria to access at least one of the software applications.*

8. A method for managing software applications *over a network*, the method comprising:
   storing, at a subscription management server, a list of available software applications available *for controlled access by subscription* from a plurality of application service providers;
   storing an indication of which software application corresponds to which of the plurality of application service providers;

receiving, at the subscription management server, a request to view at least a portion of the available software applications;
initiating, from the subscription management server, display of a list that includes at least a portion of the available software applications;
receiving, at the subscription management server, a request to subscribe to one of the available software applications;
identifying, at the subscription management server, which application service provider corresponds to the requested software application; and
providing *a client* access to the requested software application;

wherein providing access to the requested software application comprises:
receiving, at an application management server, access to the software application that is hosted by the application service provider, *the application management server positioned in the network as an intermediary between at least one of the plurality of application service providers and the client, and*
*requesting the subscription management server for an instruction based on client subscription criteria to access at least one of the software applications.*

\* \* \* \* \*